United States Patent
Andrew et al.

(10) Patent No.: US 10,860,088 B2
(45) Date of Patent: Dec. 8, 2020

(54) METHOD AND SYSTEM FOR INITIATING APPLICATION AND SYSTEM MODAL CONTROL BASED ON HAND LOCATIONS

(71) Applicant: Microsoft Technology Licensing, LLC, Redmond, WA (US)

(72) Inventors: Felix Gerard Torquil Ifor Andrew, Seattle, WA (US); Michael Edward Harnisch, Seattle, WA (US); Liang Chen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 16/119,098

(22) Filed: Aug. 31, 2018

(65) Prior Publication Data

US 2019/0339767 A1    Nov. 7, 2019

Related U.S. Application Data

(60) Provisional application No. 62/666,494, filed on May 3, 2018.

(51) Int. Cl.
| | |
|---|---|
| *G06F 3/01* | (2006.01) |
| *G09G 5/14* | (2006.01) |
| *G06F 3/033* | (2013.01) |
| *G06F 3/16* | (2006.01) |
| *G06T 19/00* | (2011.01) |

(52) U.S. Cl.
CPC .............. *G06F 3/011* (2013.01); *G06F 3/017* (2013.01); *G09G 5/14* (2013.01); *G06F 3/033* (2013.01); *G06F 3/167* (2013.01); *G06T 19/006* (2013.01)

(58) Field of Classification Search
CPC .......... G06F 3/011; G06F 3/017; G06F 3/033; G06F 3/167; G09G 5/14; G06T 19/006
USPC ........................................................ 345/156
See application file for complete search history.

(56) References Cited

U.S. PATENT DOCUMENTS

| | | | |
|---|---|---|---|
| 8,217,856 B1 * | 7/2012 | Petrou ..................... | G06F 3/011 345/8 |
| 2003/0095140 A1 * | 5/2003 | Keaton ................... | G06F 3/042 715/700 |

(Continued)

FOREIGN PATENT DOCUMENTS

EP         2708982 A2       3/2014

OTHER PUBLICATIONS

"International Search Report and Written Opinion Issued in PCT Application No. PCT/US2019/028599", dated Aug. 6, 2019, 10 Pages.

*Primary Examiner* — Mark Edwards
(74) *Attorney, Agent, or Firm* — Arent Fox LLP

(57) ABSTRACT

Methods and devices for initiating application and system modal control of a computer device based on predicted locations of a hand outside of a field of view using a computer device are disclosed. The method includes receiving hand motion information from a hand positional tracking system that tracks a position of a hand of a user. The method also includes determining the hand is outside a field of view of the computer device based on the hand motion information. The method further includes predicting a location of the hand while outside the field of view. The method also includes interacting with a secondary UX on the display based on the predicted location of the hand.

20 Claims, 4 Drawing Sheets

(56) References Cited

U.S. PATENT DOCUMENTS

| | | | |
|---|---|---|---|
| 2012/0163723 A1* | 6/2012 | Balan | G06K 9/00342 |
| | | | 382/224 |
| 2014/0078311 A1* | 3/2014 | Choi | H04N 21/4126 |
| | | | 348/169 |
| 2014/0253701 A1* | 9/2014 | Wexler | G09B 21/008 |
| | | | 348/62 |
| 2019/0188868 A1* | 6/2019 | Bagnall | G06T 7/277 |

* cited by examiner

METHOD AND SYSTEM FOR INITIATING APPLICATION AND SYSTEM MODAL CONTROL BASED ON HAND LOCATIONS

CROSS-REFERENCE TO RELATED APPLICATION(S)

This application claims the benefit of U.S. Provisional Application Ser. No. 62/666,494, entitled "METHOD AND SYSTEM FOR INITIATING APPLICATION AND SYSTEM MODAL CONTROL BASED ON HAND LOCATIONS" and filed on May 3, 2018, which is expressly incorporated by reference herein in its entirety.

BACKGROUND

The present disclosure relates to modal control of a virtual reality (VR) device, and more particularly, to modal control of a VR device based on hand locations.

One area of computer devices that has grown in recent years is VR devices, which use a graphics processing unit (GPU) to render graphics from a computer device to a display device based on rendering instructions received from the computer device. In VR devices, a scene produced on a display device can be modified based on user input, where the input may include detected movement of a head (e.g., detected movement of the VR device, such as a head mounted display (HMD)) or a hand within a field of view of the VR device.

A common problem in the application of VR devices is the use of multiple user experiences (UXs) on a display device. For many VR devices, a displayed view is based on a tabular (windowed) experience similar to that used by a desktop device. A tabular experience may include multiple windows within a displayed view and cursor positioning to perform window and application functions. In a VR device, a tabular experience may inhibit a user from fully engaging in the richness of a VR experience. For example, simultaneous use of multiple windows within the displayed view may detract from interaction by a user with a primary UX due to congestion in the displayed view caused by multiple windows. As another example, the removal and addition of windows from/to the displayed view may disturb the interaction of the user with another window due to a change in position by a head of the user when moving a cursor position within a field of view of a VR device.

Thus, there is a need in the art for improvements to the use of multiple UXs used by VR devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. The sole purpose of the summary is to present some concepts of one or more implementations of the present disclosure in a simplified form as a prelude to the more detailed description that is presented later.

The present disclosure relates to methods and devices for initiating application and system modal control of a device based on predicted locations of a hand outside of a field of view of the device.

One example implementation relates to a computer device. The computer device may include a memory storing data and instructions, a processor in communication with the memory and configured to execute the data and instructions, a display rendering a primary user experience (UX), and an operating system in communication with the memory and the processor. The operating system and processor may be operable to receive hand motion information from a hand positional tracking system that tracks a position of a hand of a user, determine the hand is outside a field of view of the display based on the hand motion information, predict, using machine learning, a location of the hand while outside the field of view, and interact with a secondary UX on the display based on the predicted location of the hand.

Another example implementation relates to a method for modal control of a computer device. The method may include receiving hand motion information from a hand positional tracking system that tracks a position of a hand of a user, determining that the hand is outside a field of view of the computer device based on the hand motion information, predicting a location of the hand while outside the field of view, and rendering a secondary UX on a display of the computer device based on the predicted location of the hand.

Another example implementation relates to a computer-readable medium storing instructions executable by a computer device. The computer-readable medium may include at least one instruction for causing the computer device to receive hand motion information from a hand positional tracking system that tracks a position of a hand of a user, at least one instruction for causing the computer device to determine that the hand is outside a field of view of the computer device based on the hand motion information, at least one instruction for causing the computer device to predict, using machine learning, a location of the hand while outside the field of view, and at least one instruction for causing the computer device to render a secondary UX on a display of the computer device based on the predicted location of the hand.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
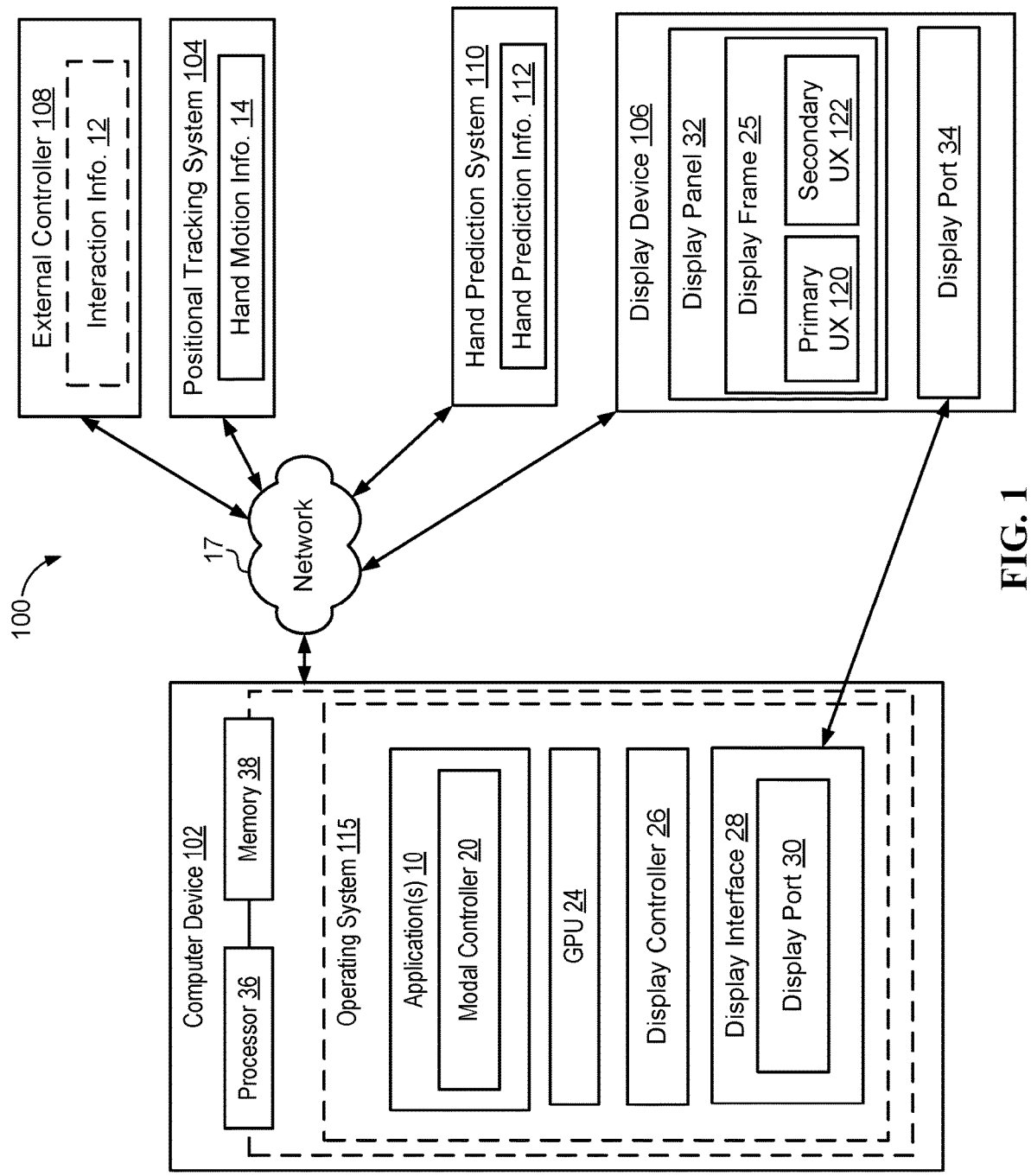
FIG. 1 is a schematic block diagram of an example computer device in accordance with an implementation of the present disclosure.

This disclosure relates to devices and methods for initiating application and system modal control of a computer device based on predicted locations of a hand outside of a field of view of the computer device. As used herein, a computer device may include a device that generates and/or displays virtual reality (VR) images (e.g., from at least one virtual environment input), mixed reality (MR) images (e.g., from at least two virtual environment inputs), and/or augmented reality (AR) images (e.g., from at least one virtual environment input and one real environment input).

Modal control is a technique whereby a primary user experience (UX) is subordinate to a secondary UX. In an example of modal control, a user may interact with the secondary UX while the primary UX is, for example, disabled or set to the background. Examples of a primary UX may include a primary window/image including a VR image, a MR image, a AR image, desktop view, or first application. Examples of a secondary UX may include a secondary window/image such as a second application, a utility window image for viewing application or system settings associated with a first application, a menu, or available command options. In an example environment, an interaction by a user with the primary UX and the secondary UX may be controlled based on the interaction of the user with the cursor via an input device such as a hand controller or a motion sensor for detected movement of a head mounted display (HMD).

Applications in a VR environment may provide a very rich interaction experience as compared to typical experiences with televisions or computer monitors due to the ability of a user to feel submerged into the environment. However, use of a tabular environment may detract from the VR environment. A tabular environment may include multiple windows within a displayed view and cursor positioning to perform window and application functions. For example, a tabular experience may diminish a displayed view accessible to a user of an HMD, the user may be required to release focus from a primary UX in order to access a secondary UX, or a head of the user may need to be moved in order to move a cursor in the VR environment.

The present disclosure provides a tubular environment within a VR environment that improves a user experience through the use of modal control. The present disclosure may place a secondary UX in a predefined three-dimensional (3D) location of a display. The secondary UX may be accessible to a user based on the placement of one or more hands of the user at a location that is outside of the field of view of the computer device. For example, the secondary UX may become accessible when the computer device determines that the user moved one or more hands outside of the field of view. In other words, the one or more hands are no longer trackable by the computer device. Instead the computer device uses Artificial Intelligence and/or Machine Learning to predict the location of the one or more hands when outside the field of view of the computer device. Based on the location of the one or more hands, the computer device may activate the secondary UX such that the user may interact with the secondary UX using a voice controller or a hand controller such as a thumb pad. Alternatively, the user may interact with the secondary UX by returning a hand(s) to the field of view of the computer device.

In the present disclosure, the computer device monitors where a user is looking and whether the one or more hands of the user is located in a field of view. When the one or more hands moves out of the field of view of the computer device, the computer device may predict based on telemetry, where the one or more hands will be positioned outside of the field of view.

If the one or more hands remains outside of the field of view for a given period of time, a modal controller may be notified of the predicted location of the one or more hands and a secondary UX associated with the predicted location of the one or more hands may be displayed. Input from an external controller may then be received and used to interact with the secondary UX. Interaction with the secondary UX may continue until the user dismisses, minimizes, or closes the secondary UX via the external controller or, in some implementations, the one or more hands returns to the field of view of the computer device.

In the present disclosure, whether a single hand or both hands are required to be outside of the field of view of the computer device may be based on an application using modal control. For example, some applications using modal control may only rely on the use of one hand (e.g., right hand) while other applications may require both hands to perform the below described functions of a VR device. Accordingly, the remaining portions of the present disclosure refer to one or more hands as hand(s) unless there is a specific implementation describing specific use of one hand or both hands.

Figure 2:
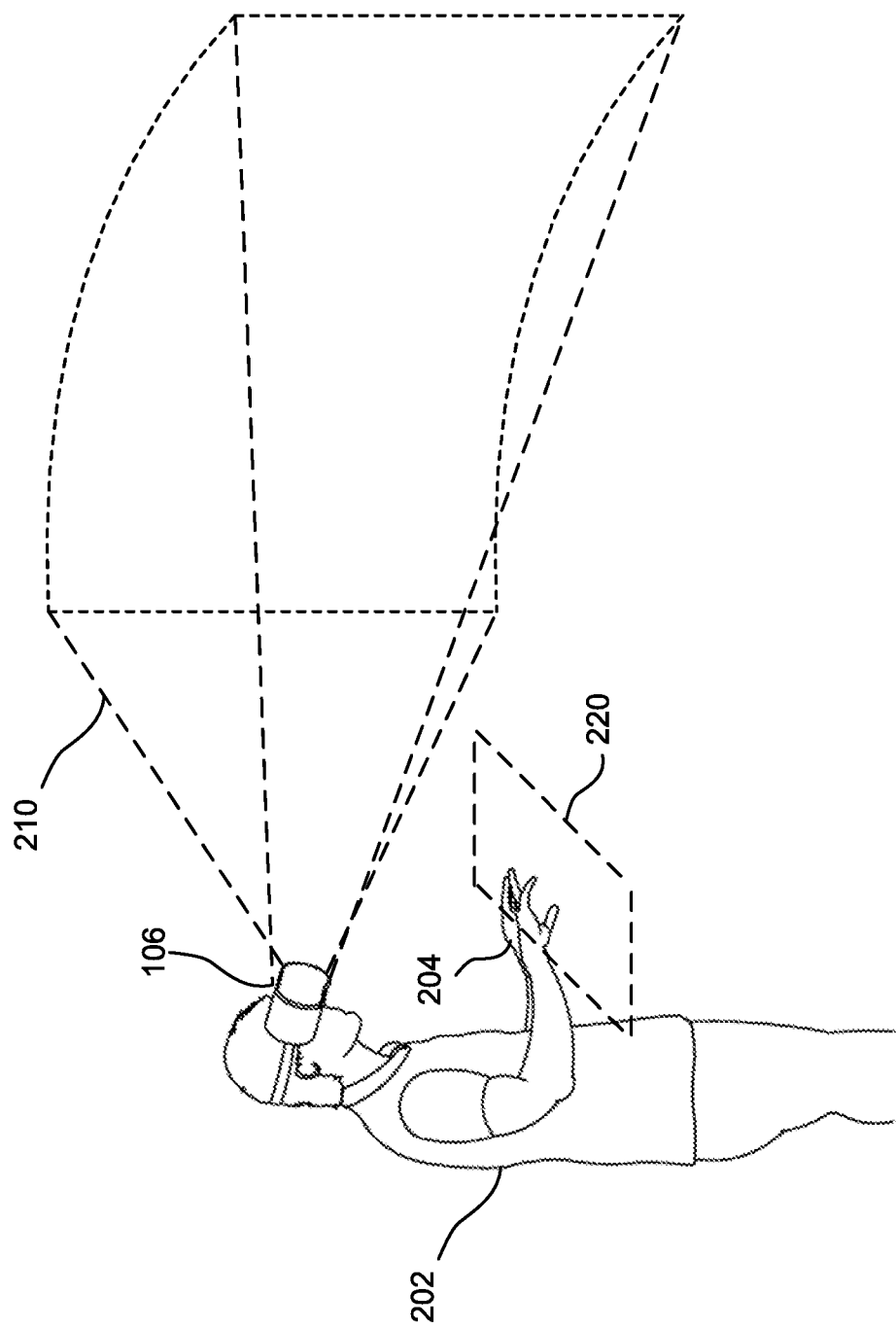
FIG. 2 is an example of a field of view of a computer device in accordance with an implementation of the present disclosure.

Referring now to FIGS. 1 and 2, an example system 100 for initiating modal control based on a predicted location 220 of a hand(s) 204 may include a computer device 102 in communication with a display device 106 via a network 17 and/or through a wired or wireless connection. The computer device 102 may execute an application 10 to perform modal control. The application 10 may be computer readable code or instructions executable to perform, for example, a game, an office productivity application, or any other type of application. When executed, the computer device 102 may generate and communicate image data for displaying one or more images (e.g., display frame 25) defining one or more scenes of the application 10 on the display device 106. Examples of the display device 106 may include an HMD device, and may have one or more display panels 32 (e.g., light emitting diode (LED), organic LED (OLED), or liquid crystal display (LCD)) capable of outputting an image for viewing by a user 202 of the system 100.

The computer device 102 may communicate with a positional tracking system 104 via the network 17 and/or through a wired or wireless connection to obtain hand motion information 14 to apply to the application 10. The hand motion information may correspond to a position or a movement of the hand(s) 204 within the field of view 210 or the absence of the hand(s) from the field of view 210. The positional tracking system is configured to generate a field of view 210 for tracking a hand(s) 204 of the user 202. The positional tracking system 104 may include, but is not limited to, one or more sensors (e.g., cameras), emitters (e.g., IR LEDs), inertial devices (accelerometer and/or gyroscope), and/or any other position sensing system capable of detecting a position, an orientation, a movement, a direction of movement, and/or a speed of movement of the hand(s) 204 of the user 202 of the system 100 within a field of view 210 of the computer device 102. An example of the field of view 210 of the computer device 102 is shown by FIG. 2. In an example, the field of view 210 may be a sensing area of the sensors (e.g., cameras) of the positional tracking system 104. In a MR system and a VR system, the field of view 210 may correspond to a displayed area of the display device 106 (e.g., HMD device). For example, in an MR system, the field of view 210 may correspond to a real life view of the user 202 while using the display device 106. As another example, in a VR system, the field of view 210 may correspond to virtual reality view of the user 202 while using the display device 106.

In some implementations, the positional tracking system 104 may include but is not limited to one or more depth cameras and one or more inertial measurement units (IMUs), tracking software, a simultaneous localization and mapping algorithm, and one or more processors. In other implementations, the positional tracking system 104 may include but is not limited to one or more sensors (e.g., cameras) for detecting one or more emitters (e.g., IR LEDs) located in the environment, and one or more processors. The positional tracking system 104 may be configured to separately track both hand(s) 204 of the user 202. For example, the positional tracking system 104 may determine movement of a first hand (e.g., right hand) and determine whether the first hand is outside or inside the field of view 210 of the computer device 102 and/or determine movement of a second hand (e.g., left hand) and whether the second hand is outside or inside the field of view 210.

In some implementations, the positional tracking system 104 may be located on the display device 106 (e.g., HMD) and may include cameras, IMUs, tracking devices, or any other device for tracking head movements of the user. In an example, the positional tracking system 104 may be configured to distinguish between the head movements (e.g., movement by head of user which causes hand(s) 204 to be outside field of view 210) of the user and hand movements (e.g., movement of hand(s) 204 to exit field of view 210) of the user when generating the hand motion information 14.

The computer device 102 may also communicate with a hand prediction system 110 via the network 17 and/or through a wired or wireless connection to obtain hand prediction information 112 to apply to the application 10. The hand prediction system 110 is configured to predict a location of the hand(s) 204 of the user 202 when the hand(s) 204 is outside the field of view 210 of the computer device 102, as shown by FIG. 2. For example, when the hand(s) 204 of the user 202 is removed from the field of view 210, the position tracking system 104 is no longer able to determine a location of the hand(s) 204. The hand prediction system 110 therefore predicts a location (predicted location 220) of the hand(s) 204 when outside the field of view 210 of the computer device 102. Prediction of the location of the hand(s) 204 may be based on hand motion information 14. For example, the predication of the location of the hand(s) 204 may be based on the position, the orientation, the movement, the direction of movement, and/or the speed of movement of the hand(s) 204 when moving from inside the field of view 210 to outside the field of view 210. In some examples, the prediction of the location of the hand(s) 204 may exclude information relating to head movement.

In some implementations, the hand prediction system 110 may be a machine learning system configured to predict the location of the hand(s) 204 when outside the field of view 210 and to generate the hand prediction information 112. The hand prediction system 110 may be trained based on machine learning models using supervised learning, unsupervised learning, or a combination of both. In training the machine learning model using supervised learning, the model may be presented with labeled inputs and their desired outputs so that the model is trained to learn a general rule that maps inputs to outputs. In training the machine learning model using unsupervised learning, no labels may be given to the machine learning model such that the model determines the structure of the input, where the model can discover hidden patterns in the input and/or learn more about predicting certain features (e.g., if the model has already been through supervised learning).

In addition, the computer device 102 may communicate with one or more external controllers 108 via the network 17 and/or through a wired or wireless connection to obtain interaction information 12 to apply to the application 10. The external controller 108 may include, but is not limited to, a gamepad, joystick, keyboard, mouse, voice controller, or any other input device that may provide interaction information 12 for a virtual environment, such as a game, a virtual environment, or an augmented environment associated with the application 10.

The computer device 102 may include an operating system 115 executed by one or more processors 36 and/or a memory 38. The memory 38 of the computer device 102 may be configured for storing data and/or computer-executable instructions defining and/or associated with the operating system 115, and the processor 36 may execute such data and/or instructions to instantiate the operating system 115. An example of the memory 38 may include, but is not limited to, random access memory (RAM), read only memory (ROM), tapes, magnetic discs, optical discs, volatile memory, non-volatile memory, or any type of memory usable by a computer, and/or any combination thereof. An example of the processor 36 may include, but is not limited to, any processor specially programmed as described herein, including a controller, microcontroller, application specific integrated circuit (ASIC), field programmable gate array (FPGA), system on chip (SoC), or other programmable logic or state machine.

The computer device 102 may include any mobile or fixed computer device, which may be connectable to the network 17. The computer device 102 may be, for example, a computer device such as a desktop or laptop or tablet computer, a cellular telephone, a gaming device, an MR device, a VR device, a music device, a television, a navigation system, a camera, a personal digital assistant (PDA), or a handheld device, or any other computer device having wired and/or wireless connection capability with one or more other devices and/or communication networks.

The operating system 115 may include a graphics processing unit (GPU) 24 operable to render one or more image frames and determine when to transmit rendered image frames for presentation on the display device 106. In particular, the GPU 24 may receive data and/or instructions from one or more applications 10 and may generate one or more display frames (e.g., display frame 25) based on the received data and/or instructions. The GPU 24 may communicate with a display controller 26 to transmit rendered image frames (e.g., display frame 25) for presentation on the display device 106.

In addition, operating system 115 may also include a display interface 28 that may be communicatively coupled with the processor 36 and/or the memory 38 for communicating with the display device 106 via a display port 30. In an implementation, the display controller 26 may instruct the display interface 28 to communicate a rendered image (e.g., display frame 25) to display on the display device 106. The display port 30 may transmit the rendered image to the display port 34. The display port 30 may include various types of ports including, but not limited to, high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications, for example, via the network 17 between the computer device 102 and the display device 106.

The computer device 102 may also include the one or more applications 10 that may be executed by the processor 36 to present one or more images (e.g., display frame 25) on the display device 106. The one or more applications 10 executed by the processor 36 may also operate in cooperation with the operating system 115 and/or the GPU 24 to run, for example, a modal controller 20, and generate image frame(s) for presentation on the display device 106.

The one or more applications 10 may include the modal controller 20 operable to render one or more display frames 25 on the display panel 32 based on hand motion information 14 and hand prediction information 112. In an implementation, the modal controller 20 may determine when to display a primary user experience (UX) 120 and/or a secondary UX 122. In an implementation, the primary UX 120 may be displayed when the hand(s) 204 of the user 202 is within the field of view 210 of the computer device 102, and the secondary UX 122 may be displayed when the hand(s) 204 is outside the field of view 210 of the computer 102. In some aspects, the secondary UX 122 may be displayed alone, simultaneous with the primary UX 120, or with another UX.

In an implementation, the modal controller 20 determines whether the hand(s) 204 of the user 202 is inside or outside the field of view 210 of the computer device 102 based on hand motion information 14. Determining whether the hand(s) 204 is inside may be based on the sensors (e.g., cameras) of the positional tracking system 104 sensing the hand(s) 204 is within the field of view 210 of the computer device 102. In other words, the hand(s) 204 is inside of or within the field of view of the computer device 102 when the hand(s) 204 is within a tracking area of the sensors of the positional tracking system 104 (i.e., hand(s) 204 is trackable by the positional tracking system 104). Conversely, the hand(s) 204 is outside of the field of view of the computer device 102 when the hand(s) 204 is not within a tracking area of the sensors of the positional tracking system 104 (i.e., hand(s) 204 is not trackable by the positional tracking system 104). Further, the modal controller 20 may determine whether the hand(s) 204 is inside or outside of the field of view 210 when the hand(s) 204 has remained outside the field of view 210 for longer than a predetermined period of time (e.g., 1 second). In an implementation, the predetermined period of time may be determined based on machine learning which may take into account habits, movements, and actions of the user 202.

In an implementation, the modal controller 20 may also determine that the hand(s) 204 were moved out of the field of view 210 via hand movement.

When determined that the hand(s) 204 of the user 202 is outside the field of view 210 of the computer device 102, the modal controller 20 may determine a predicted location 220 of the hand(s) 204 based on the hand prediction information 112. The predicted location 220 may be used by the modal controller 20 to render the secondary UX for the display device 106. In some implementations, the secondary UX 122 is associated with the predicted location of the hand(s) 204. For example, when the predicted location is a first predicted location (e.g., hand(s) 204 of the user 202 outside of the field of view 210 and at shoulder level), the secondary UX 122 may be a first utility UX (e.g., application settings), and when the predicted location is a second predicted location (e.g., hand(s) 204 of the user 202 outside of the field of view 210 and at waist level), the secondary UX 122 may be a second utility UX (e.g., system settings).

The modal controller 20 may further be operable to receive input from the external controller(s) 108 or the hand(s) 204 to interact with the secondary UX 122. The input may be real world movements of the external controller(s) 108 or hand(s) 204. For instance, the modal controller 20 may receive the virtual motion information 12 from the external controller(s) 108 (e.g., hand controller) that corresponds to movement of a joystick and/or clicking of a button. In another instance, the hand(s) 204 may return to the field of view 210, while the secondary UX 122 is being displayed, and the hand motion information 14 may correspond to a position or a movement of the hand(s) 204 within the field of view 210. Interaction with the secondary UX 122 may include adjusting a secondary window size (e.g., dismissing, minimizing, or maximizing a window), selecting an object (e.g., selecting button or text), scrolling through a menu, or performing any other type of interaction with the secondary UX 122.

In some implementations, the positional tracking system 104 may separately track both hands 204 of the user 202 such that movements by a first hand (e.g., right hand) may be used by the modal controller 20 to interact with the secondary UX 122 (e.g., second application, settings), when the secondary UX 122 is rendered on the display device 106, and movements by a second hand (e.g., left hand) may be used by the modal controller 20 to interact with the primary UX 120 (e.g., operating system UX, first application, application launching, switching between applications, interaction with notifications). The modal controller 20 may transform the input (e.g., the virtual motion information 12 or the hand motion information 14) into virtual coordinates corresponding to interactions (e.g., cursor movement or button clicking) on the secondary UX 122 of the display frame 25.

While illustrated as being separate from each other, one skilled in the art would recognize that one or more of the computer device 102, the positional tracking system 104, the display device 106, the external controller 108, and/or the hand prediction system 110 may be remote from each other, located on each other, or partially remote from and partially located on each other.

Figure 3:
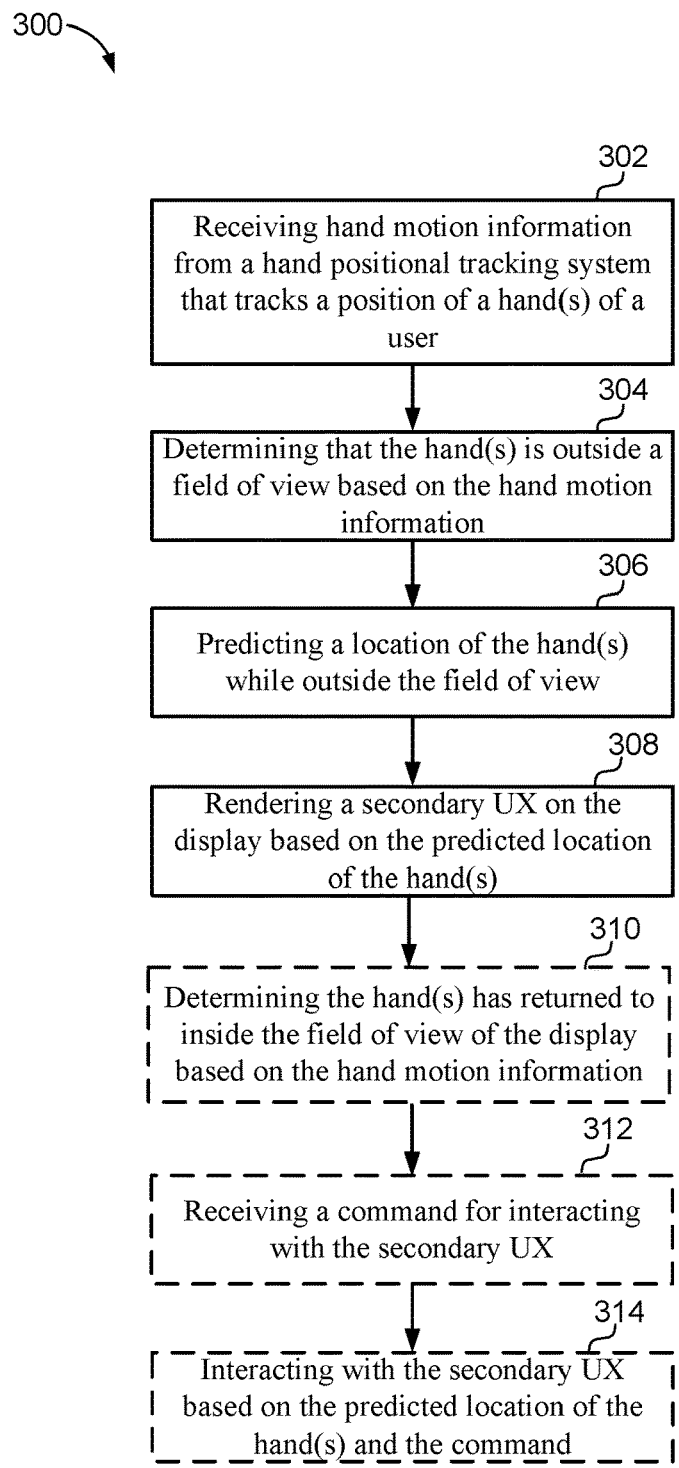
FIG. 3 is an example method flow for modal control in a computer device in accordance with an implementation of the present disclosure.

Referring now to FIG. 3, an example method 300 for modal control of the computer device 102 is described. At block 302, the method 300 may include receiving hand motion information from a hand positional tracking system that tracks a position of a hand(s) of a user. For example, as shown by FIGS. 1 and 2, the computer device 102 may receive the hand motion information 14 from the positional tracking system 104. In an example, the hand motion information 14 may correspond to positional information of the hand(s) 204 of the user 202 while the hand(s) 204 is within the field of view 210 of the computer device 102 or the absence of the hand(s) from the field of view 210.

At block 304, the method 300 may include determining that the hand(s) is outside a field of view of a computer device based on the hand motion information. For example, as shown by FIGS. 1 and 2, the computer device 102 may determine that the hand(s) 204 is outside the field of view 210 when sensors of the positioning tracking system 104 do not detect the hand(s) 204.

At block 306, the method 300 may include predicting a location of the hand(s) while outside the field of view. For example, as shown by FIGS. 1 and 2, the computer device 102 may receive hand prediction information 112 from the hand prediction system 110. The hand prediction information 112 may be based on machine learning which determines a predicted location 220 of the hand(s) 204.

In some examples, the hand prediction information 112 may further be based on stored historical actions performed by the user 202. For example, the computer device 102 may store in the memory 38 any actions performed by the user 202. The saved actions may be used by the computer device to learn from tendencies and motions performed by the user 202 and to better predict the hand prediction information 112. In some examples, the historical information may be shared with the hand prediction system 110.

At block 308, the method may include rendering a secondary UX on the display based on the predicted location of the hand(s). For example, as shown by FIGS. 1 and 2, the modal controller 20 may determine, based on the hand prediction information 112, a location of the hand(s) 204 while outside the field of view 210 of the computer device 102. Based on the predicted location 220, the modal controller 20 may instruct the display interface 28 to have the display panel 32 display the secondary UX 122.

At block 310, the method may optionally include determining that the hand(s) has returned to inside the field of view of the display based on the hand motion information. For example, as shown by FIGS. 1 and 2, the modal controller 20 may receive hand motion information 14 after the hand(s) 204 has returned to the field of view 210. In some implementations, when the modal controller 20 determines that the hand(s) 204 has returned to inside the field of view 210, the computer device 102 may dismiss, minimize or close the secondary UX 122. Alternatively, the modal controller 20 may receive commands for interacting with the secondary UX 122, as discussed in block 312 below.

At block 312, the method may optionally include receiving a command for interacting with the secondary UX. For example, as shown by FIG. 1, the modal controller 20 may receive a command from one or more of the external controller 108 or the positional tracking system 104. In an example, the command may correspond to commands from a hand controller or a voice controller to indicate an interaction with the secondary UX 122. Alternatively, the command may correspond to hand motions detected by the positional tracking system 104 after the hand(s) 204 has returned to the inside of the field of view 210.

At block 314, the method may optionally include interacting with the secondary UX based on the command. For example, as shown by FIG. 1, the modal controller 20 may interact with the secondary UX 122 based on the command received from the external controller 108 or the positional tracking system 104. As previously discussed, interaction with the secondary UX 122 may include, for example, clicking on a button, highlighting images or text, or any other interaction with the secondary UX 122. Further, the interaction may be determined based on a predicted location of the hand(s) 204 of the user 202. For example, when the hand(s) 204 is predicted to be a first location, the secondary UX 122 may be, for example, an application settings window associated with a first application or a second application, and when the hand(s) 204 is predicted to be a second location, the secondary UX 122 may be, for example, a systems settings window or a third application. Therefore, the interaction with the secondary UX 122 may be different based on the type of secondary UX 122 being displayed.

Figure 4:
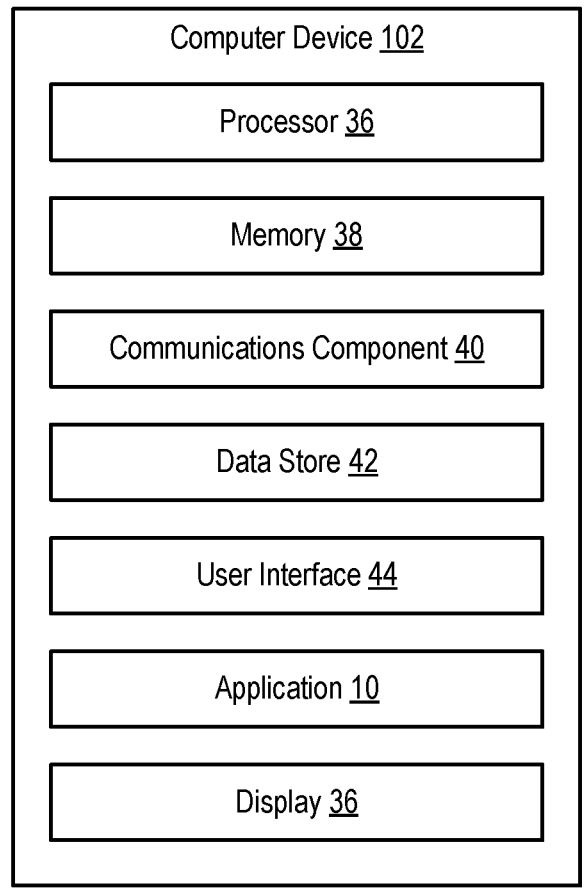
FIG. 4 is a schematic block diagram of an example device in accordance with an implementation of the present disclosure.

Referring now to FIG. 4, illustrated is an example of computer device 102 in accordance with an implementation, including additional component details as compared to FIG. 1.

Computer device 102 may include a communications component 40 that provides for establishing and maintaining communications with one or more parties utilizing hardware, software, and services as described herein. Communications component 40 may carry communications between components on the computer device 102, as well as between the computer device 102 and external devices, such as devices located across a communications network and/or devices serially or locally connected to the computer device 102. For example, communications component 40 may include one or more buses, and may further include transmit chain components and receive chain components associated with a transmitter and receiver, respectively, operable for interfacing with external devices.

Additionally, the computer device 102 may include a data store 42, which can be any suitable combination of hardware and/or software, that provides for mass storage of information, databases, and programs employed in connection with implementations described herein. For example, the data store 42 may be a data repository for the applications 10 (FIG. 1), GPU 24 (FIG. 1), display controller 26 (FIG. 1), and/or display interface 28 (FIG. 1).

The computer device 102 may also include a user interface component 44 operable to receive inputs from a user of computer device 102 and further operable to generate outputs for presentation to the user. The user interface component 44 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user interface component 44 may include one or more output devices, including but not limited to a display, a speaker, a haptic feedback mechanism, a printer, any other mechanism capable of presenting an output to a user, or any combination thereof.

In an implementation, the user interface component 44 may transmit and/or receive messages corresponding to the operation of the applications 10, GPU 24, display controller 26, and/or display interface 28. In addition, the processor 36 may execute the applications 10, GPU 24, display controller 26, and/or display interface 28, and the memory 38 or data store 42 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory storing data and instructions;
   a processor in communication with the memory;
   a head mounted display (HMD) rendering a primary user experience (UX); and
   an operating system in communication with the memory and the processor, wherein the operating system and the processor are operable to:
      receive hand motion information from a hand positional tracking system that tracks a position of a hand of a user inside a field of view of the HMD, the hand motion information including information of the hand moving from inside the field of view to outside the field of view;
      determine the hand is outside the field of view of the HMD based on the hand motion information;
      predict a location of the hand while outside the field of view; and
      interact with a secondary UX on the HMD based on the predicted location of the hand, the secondary UX being different from the primary UX.

2. The computer device of claim 1, wherein the location of the hand while outside the field of view is predicted based on machine learning.

3. The computer device of claim 1, wherein the operating system and the processor are further operable to:
   receive a command for interacting with the secondary UX while the hand is located outside the field of view; and
   interact with the secondary UX based on the command.

4. The computer device of claim 3, wherein the command is one or more of a voice command or a signal from a hand controller.

5. The computer device of claim 3, wherein the operating system and the processor are further operable to:
   interact with the secondary UX according to a first instruction based on a first predicted location of the hand and a first command; and
   interact with the secondary UX according to a second instruction based on a second predicted location of the hand and a second command,
   wherein the first instruction is different from the second instruction and the first predicted location is different from the second predicted location.

6. The computer device of claim 3, wherein the operating system and the processor are further operable to:
   determine the hand has returned to inside the field of view of the HMD based on the hand motion information,
   wherein the command is based on the hand motion information received while the hand is inside the field of view.

7. The computer device of claim 1, wherein the location of the hand while outside the field of view is predicted further based on stored historical actions by the user.

8. The computer device of claim 1, wherein the secondary UX is rendered on the HMD when the hand is determined to be outside the field of view of the HMD.

9. A method for modal control of a computer device, the method comprising:
- receiving hand motion information from a hand positional tracking system that tracks a position of a hand of a user inside a field of view of a head mounted display (HMD) of the computer device, the HMD rendering a primary user experience (UX), the hand motion information including information of the hand moving from inside the field of view to outside the field of view;
- determining that the hand is outside the field of view of the HMD based on the hand motion information;
- predicting a location of the hand while outside the field of view; and
- rendering a secondary UX on the HMD based on the predicted location of the hand, the secondary UX being different from the primary UX.

10. The method of claim 9, wherein the location of the hand while outside the field of view is predicted based on machine learning.

11. The method of claim 9, further comprising:
- receiving a command for interacting with the secondary UX; and
- interacting with the secondary UX based on the command.

12. The method of claim 11, wherein the command is one or more of a voice command or a signal from a hand controller.

13. The method of claim 11, wherein the secondary UX may be interacted with according to a first instruction when the location is a first predicted location of the hand, and the secondary UX may be interacted with according to a second instruction when the location is a second predicted location of the hand, and
- wherein the first predicted location is different from the second predicted location.

14. The method of claim 11, further comprising:
- determining the hand has returned to inside the field of view of the HMD based on the hand motion information,
- wherein the command is based on the hand motion information received while the hand is inside the field of view.

15. The method of claim 9, wherein the location of the hand while outside the field of view is predicted further based on stored historical actions by the user.

16. The method of claim 9, wherein the secondary UX is rendered on the HMD when the hand is determined to be outside the field of view of the HMD.

17. A non-transitory computer-readable medium storing instructions executable by a computer device, comprising:
- at least one instruction for causing the computer device to receive hand motion information from a hand positional tracking system that tracks a position of a hand of a user inside a field of view of a head mounted display (HMD) of the computer device, the HMD rendering a primary user experience (UX), the hand motion information including information of the hand moving from inside the field of view to outside the field of view;
- at least one instruction for causing the computer device to determine that the hand is outside a field of view of the HMD based on the hand motion information;
- at least one instruction for causing the computer device to predict a location of the hand while outside the field of view; and
- at least one instruction for causing the computer device to render a secondary UX on the HMD based on the predicted location of the hand, the secondary UX being different from the primary UX.

18. The non-transitory computer-readable medium of claim 17, wherein the location of the hand while outside the field of view is predicted based on machine learning.

19. The non-transitory computer-readable medium of claim 17, further comprising:
- at least one instruction for causing the computer device to receive a command for interacting with the secondary UX while the hand is located outside the field of view; and
- at least one instruction for causing the computer device to interact with the secondary UX based on the command.

20. The non-transitory computer-readable medium of claim 19, wherein the command is one or more of a voice command or a signal from a hand controller.

* * * * *